T. DASTOLI.
TRAP DOOR.
APPLICATION FILED MAR. 12, 1915.

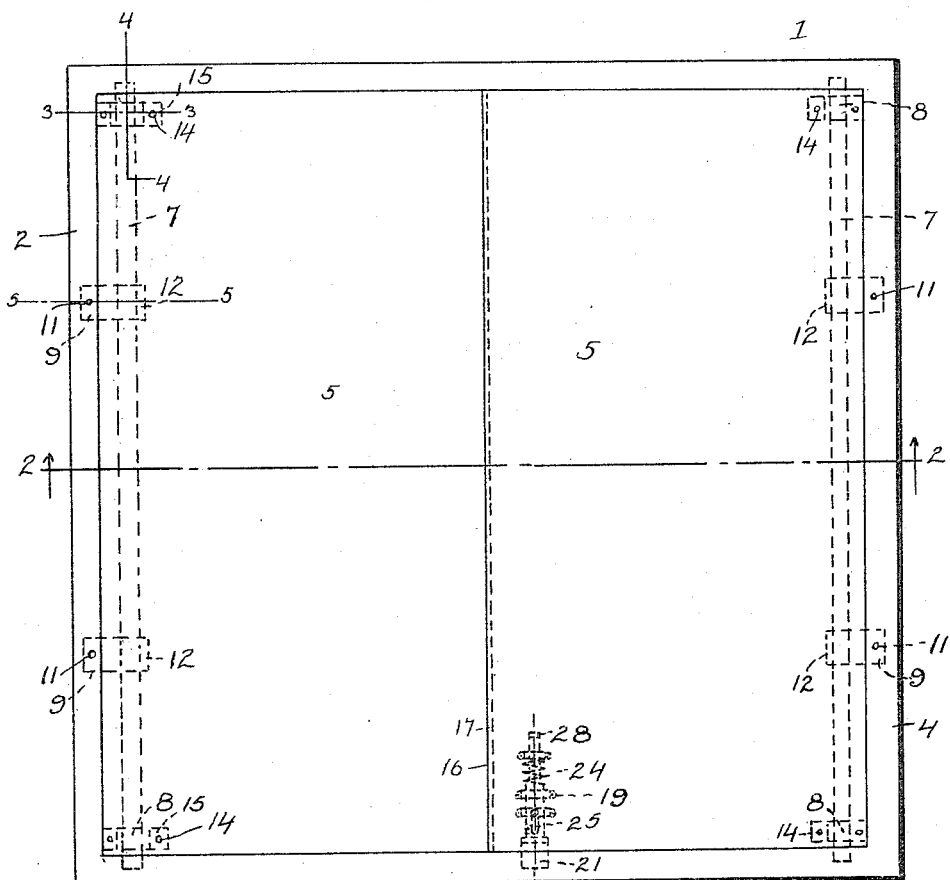

1,235,446.

Patented July 31, 1917.
2 SHEETS—SHEET 2.

Witnesses
R. M. Jones
H. F. Rey

Inventor
T. Dastoli
By
Attorney

UNITED STATES PATENT OFFICE.

THOMAS DASTOLI, OF UTICA, NEW YORK.

TRAP-DOOR.

1,235,446.  Specification of Letters Patent.  Patented July 31, 1917.

Application filed March 12, 1915. Serial No. 13,882.

*To all whom it may concern:*

Be it known that I, THOMAS DASTOLI, a citizen of the United States, residing at Utica, in the county of Oneida and State of New York, have invented certain new and useful Improvements in Trap-Doors; and I do hereby declare the following to be a full, clear, and exact description of the invention, such as will enable others skilled in the art to which it appertains to make and use the same.

The invention relates to improvements in trap doors.

The object of the present invention is to improve the construction of trap doors and to provide a simple, practical, and inexpensive metallic trap door of great strength and durability with a novel means for mounting a pair of door sections hingedly within an angle iron frame and for affording a firm support at the hinges so that the metal trap doors will stand a relatively large amount of use and abuse without liability of injuring the hinged connection.

With these and other objects in view the invention consists in the construction and novel combination and arrangement of parts hereinafter fully described, illustrated in the accompanying drawings and pointed out in the claim hereto appended, it being understood that various changes in the form, proportion and minor details of construction may be resorted to without departing from the spirit or sacrificing any of the advantages of the invention.

In the drawings—

Figure 1 is a plan view of a trap door constructed in accordance with this invention, Fig. 2 is a transverse sectional view of the same.

Like numerals of reference designate corresponding parts in all the figures of the drawings.

Figure 6:
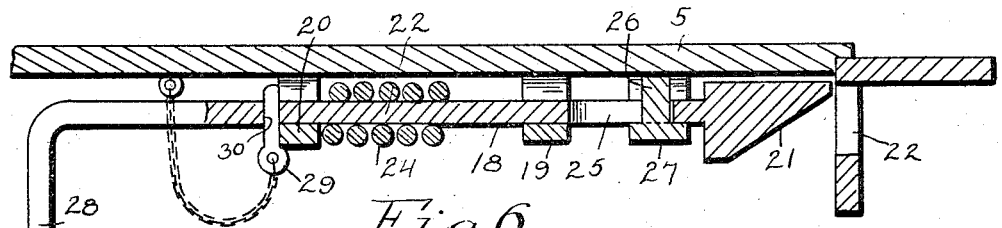
Fig. 6 is an enlarged detail sectional view illustrating the construction of the latch for securing the trap door in its closed position.
Figure 7:
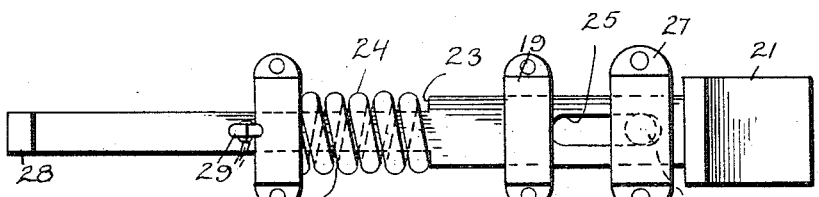
Fig. 7 is a plan view of the latch.
Figure 3:
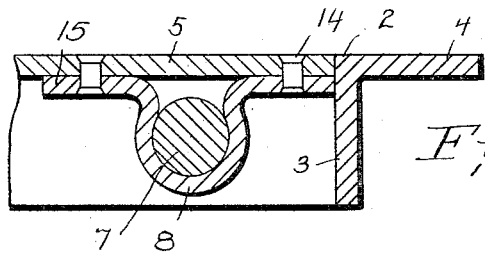
Figs. 3, 4, and 5 are detail sectional views illustrating the construction of the hinge connection for securing the trap door sections to the frame of the trap door opening.
Figure 4:
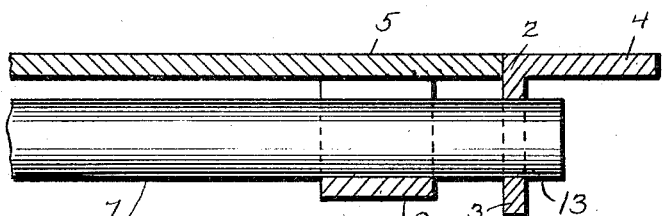
Figure 5:
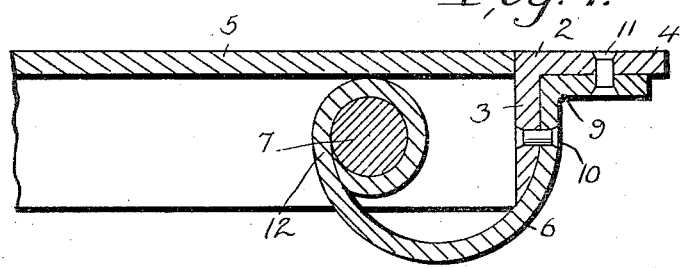

In the accompanying drawings in which is illustrated the preferred embodiment of the invention, 1 designates a rectangular metal frame suitably mounted at a trap door opening and composed of L beam members 2 provided with inner depending vertical flanges or wings 3 and outwardly extending horizontal wings or flanges 4. The opening within the rectangular frame 1 receives a pair of trap door sections 5 each hinged at its outer edge or adjacent thereto to the rectangular frame by a hinged structure comprising a plurality of supporting brackets 6, a pintle rod 7 and a plurality of eyes or bearings 8. The supporting bracket 6 which is constructed of steel or other suitable material consists of a curved approximately U-shaped body portion provided at its outer end or sides with an approximately L-shaped attaching portion 9 formed by flattening the metal and bending the same at right angles as shown to fit the angle iron frame 1. The bracket 6 extends beneath the depending vertical flange or wing 3 and is secured to both the vertical and horizontal wings or flanges 3 and 4 by rivets 10 and 11 or other suitable fastening devices at the exterior face of the vertical flange 3 and the lower face of the horizontal flange 4, as clearly illustrated in Fig. 5 of the drawings. The bracket 6 is also provided at its inner end with a bearing eye 12 arranged in the plane of the vertical wings or flanges of the rectangular frame and spaced from the adjacent vertical flange 3. The eyes 12 of the supporting brackets are arranged in alinement with each other and with bearing openings 13 in the end vertical flanges adjacent to the terminals of the pintle rod 7. The pintle rod 7 which consists of a round rod or bar extends through the bearing openings of the webs or flanges and through the eyes of the supporting brackets and it is embraced by the straps 6 constructed of steel or other suitable material and secured by rivets 14 or other suitable fastening devices to the lower face of the door section. These steel bearings each consist of a single piece of metal curved at intermediate points to embrace the pintle rod and form a loop or eye and having its terminals bent outwardly in opposite directions to form attaching portions 15. By means of the straps the brackets and the pintle rod the trap door sections are securely mounted within the frame 1 and are hingedly connected with the same. This construction enables the trap door sections to be roughly handled without liability of injuring the hinges. The trap door sections are provided with overlapping contiguous edges 10 and 17 and the trap door section having the upper edge of the overlapping joint is equipped with a suitable latch consisting of a spring actuated bolt 18 guided in loops 19 and 20. The latch bolt which is provided at its outer end with a beveled head 21 for engaging an opening 22 of the frame 1 is reduced to form a shoulder 23 which is engaged by a spring 24 interposed between the shoulder and one of the loops in which the latch bolt is mounted. The latch bolt is also provided with a slot 25 which receives a stud 26 of a loop 27 in which the outer portion of the latch bolt slides. Any suitable latch may of course be employed and the latch bolt is provided at its inner end with an arm 28 constituting a handle and adapted to be grasped by the operator to withdraw the bolt against the action of the spring to enable a pin or nail 29 to be placed in a perforation 30 of the latch bolt for holding the same retracted when desired. When the pin or nail is arranged in the perforation 30 it engages the adjacent loop 20.

By the construction and arrangement of parts hereinbefore set forth, a trap door improvement is produced which is simple, efficient and comprises few parts, and is not apt to get out of order. By using the L-beam construction as shown, for the door frame it can be quickly and snugly placed in the aperture it is to protect without the aid of exterior attachments; and by positioning the brackets, pintle rod supports therefor and the straps for connecting the doors to the pintle rods, the opening made when the door sections are raised, is practically unobstructed as the hinge parts do not project materially into such opening and the rear edges of the door sections being out of the way behind the pintle rods and held thereby.

What is claimed is:—

In a device of the class described, the combination with a rectangular frame formed from metallic side and end beams consisting of inner vertical flanges and horizontal flanges projecting outwardly from the upper edges of said vertical flanges, the end vertical flanges having horizontally alined bearing openings adjacent the junction of the side and end flanges, continuous horizontal pintle rods having their ends mounted in said alined openings, rigid bent supporting brackets extending from the pintle rods to the outside of the frame, said brackets having a portion rigidly secured to the side vertical flanges and the underside of the side horizontal flanges, said brackets provided at their inner ends with an eye to receive the pintle rod and support the same, door sections adapted to meet at the center of the door opening, the rear edges of said sections projecting beyond the plane of the pintle rods and adapted to lie in close relation with the inner vertical side flanges when the door sections are in closed position, and metal straps secured at each end to the lower face of the door sections and embracing the pintle rods intermediate the ends, the pintle rods lying adjacent the inner vertical flanges to permit the doors to swing upon the same and to support the rear edges of the door sections between the pintle rods and said vertical flanges when the door sections are in open position.

In testimony whereof I affix my signature in presence of two witnesses.

THOMAS DASTOLI.

Witnesses:
 ROCCO M. LA BELLA,
 BILLY SINISGALLI.

Copies of this patent may be obtained for five cents each, by addressing the "Commissioner of Patents, Washington, D. C."